United States Patent
Kharitonsky et al.

(10) Patent No.: US 10,200,745 B2
(45) Date of Patent: Feb. 5, 2019

(54) SYSTEM AND METHOD FOR CLOUD DIGITAL VIDEO RECORDERS

(71) Applicant: Cisco Technology, Inc., San Jose, CA (US)

(72) Inventors: Dany Kharitonsky, Kfar Adumim (IL); David S. Morgan, Apex, NC (US); Clint Ricker, Lawrenceville, GA (US); Dan Elbert, Jerusalem (IL); Anatoly Seldin, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/450,047

(22) Filed: Mar. 6, 2017

(65) Prior Publication Data
US 2018/0255347 A1    Sep. 6, 2018

(51) Int. Cl.
*H04N 21/43* (2011.01)
*H04N 21/433* (2011.01)
(Continued)

(52) U.S. Cl.
CPC ..... *H04N 21/4334* (2013.01); *H04L 67/1097* (2013.01); *H04L 67/22* (2013.01);
(Continued)

(58) Field of Classification Search
None
See application file for complete search history.

(56) References Cited

U.S. PATENT DOCUMENTS

| 7,305,691 | B2 | 12/2007 | Cristofalo |
| 7,366,793 | B2 | 4/2008 | Kenner et al. |

(Continued)

OTHER PUBLICATIONS

Lucas, Damien; Ins and Outs of Cloud DVR (Industry Whitepaper—Anevia, 2015).
(Continued)

*Primary Examiner* — Cai Y Chen
(74) *Attorney, Agent, or Firm* — Merchant & Gould P.C.

(57) ABSTRACT

In one embodiment, a first value is computed on a networked computing device, the first value being associated with storing a recording of a broadcast video at a first cloud storage device situated in a first one of a plurality of regions, for playback on a remote client device situated in the first one of the plurality of regions, the first value being a measure of user consumption patterns and use of computing and network resources. A second value is computed on the networked computing device, the second value being associated with storing the recording of the broadcast video at a second cloud storage device situated in a second one of the plurality of regions, for playback on a remote client device situated in the second one of the plurality of regions, the second value being a measure of user consumption patterns and use of computing and network resources. The first and second values are compared on the networked computing device in order to determine a preferred storage region, the recording of the broadcast video is stored on the one of the first cloud storage device and the second cloud storage device in the preferred storage region, and the one of the first cloud storage device and the second cloud storage device in the preferred storage region is instructed to store the recording of the broadcast video. Related hardware, systems, and methods are also described.

20 Claims, 4 Drawing Sheets

(51) Int. Cl.
*H04L 29/08* (2006.01)
*H04N 21/458* (2011.01)
*H04N 21/4147* (2011.01)
*H04N 21/442* (2011.01)

(52) U.S. Cl.
CPC ... *H04N 21/4147* (2013.01); *H04N 21/44204* (2013.01); *H04N 21/44222* (2013.01); *H04N 21/4583* (2013.01)

(56) References Cited

U.S. PATENT DOCUMENTS

| | | | |
|---|---|---|---|
| 8,817,094 B1 * | 8/2014 | Brown | H04N 7/188 348/143 |
| 9,078,041 B2 | 7/2015 | van Coppenolle et al. | |
| 9,124,911 B2 * | 9/2015 | Rothschild | H04N 21/236 |
| 9,250,085 B2 | 2/2016 | Hwang et al. | |
| 2013/0282890 A1 | 10/2013 | Ma et al. | |
| 2014/0082653 A1 * | 3/2014 | van Coppenolle | H04N 21/4627 725/25 |

OTHER PUBLICATIONS

Mestric, Roland; Is Network DVR Ready For Prime Time? (Oct. 10, 2014).
Seward, Zachary M; The Cloud DVR is Going Mainstream Before Anyone Knows if it's Legal (Oct. 3, 2014).

* cited by examiner

SYSTEM AND METHOD FOR CLOUD DIGITAL VIDEO RECORDERS

TECHNICAL FIELD

The present disclosure generally relates to cloud digital video recorder (CDVR) deployments.

BACKGROUND

Digital video recorders (DVRs) are electronic devices which record video in a digital format to a digital storage device, such as, but not limited to a flash drive, a memory card, a solid state drive, a hard disk drive, or other storage device, as is known in the art. Some DVRs record video to a networked storage device, which may be referred to sometimes as "cloud storage". Cloud DVRs, or, CDVRs, typically store the video in logical pools, where the physical storage may span multiple servers (and often locations). Content recorded as a CDVR recording may be consumed on multiple user devices, at different geographical locations.

As a result of various legal and contractual scenarios, in some cases, one copy of a recorded content item per recording user needs to be maintained by the service provider in a cloud storage environment. For example, if one thousand users all record a television program broadcast at one particular time, then the service provider would need to store one thousand copies of the recorded television program in cloud storage.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS
OVERVIEW

In one embodiment, a first value is computed on a networked computing device, the first value being associated with storing a recording of a broadcast video at a first cloud storage device situated in a first one of a plurality of regions, for playback on a remote client device situated in the first one of the plurality of regions, the first value being a measure of user consumption patterns and use of computing and network resources. A second value is computed on the networked computing device, the second value being associated with storing the recording of the broadcast video at a second cloud storage device situated in a second one of the plurality of regions, for playback on a remote client device situated in the second one of the plurality of regions, the second value being a measure of user consumption patterns and use of computing and network resources. The first and second values are compared on the networked computing device in order to determine a preferred storage region, the recording of the broadcast video is stored on the one of the first cloud storage device and the second cloud storage device in the preferred storage region, and the one of the first cloud storage device and the second cloud storage device in the preferred storage region is instructed to store the recording of the broadcast video. Related hardware, systems, and methods are also described.

Exemplary Embodiment

Figure 1:
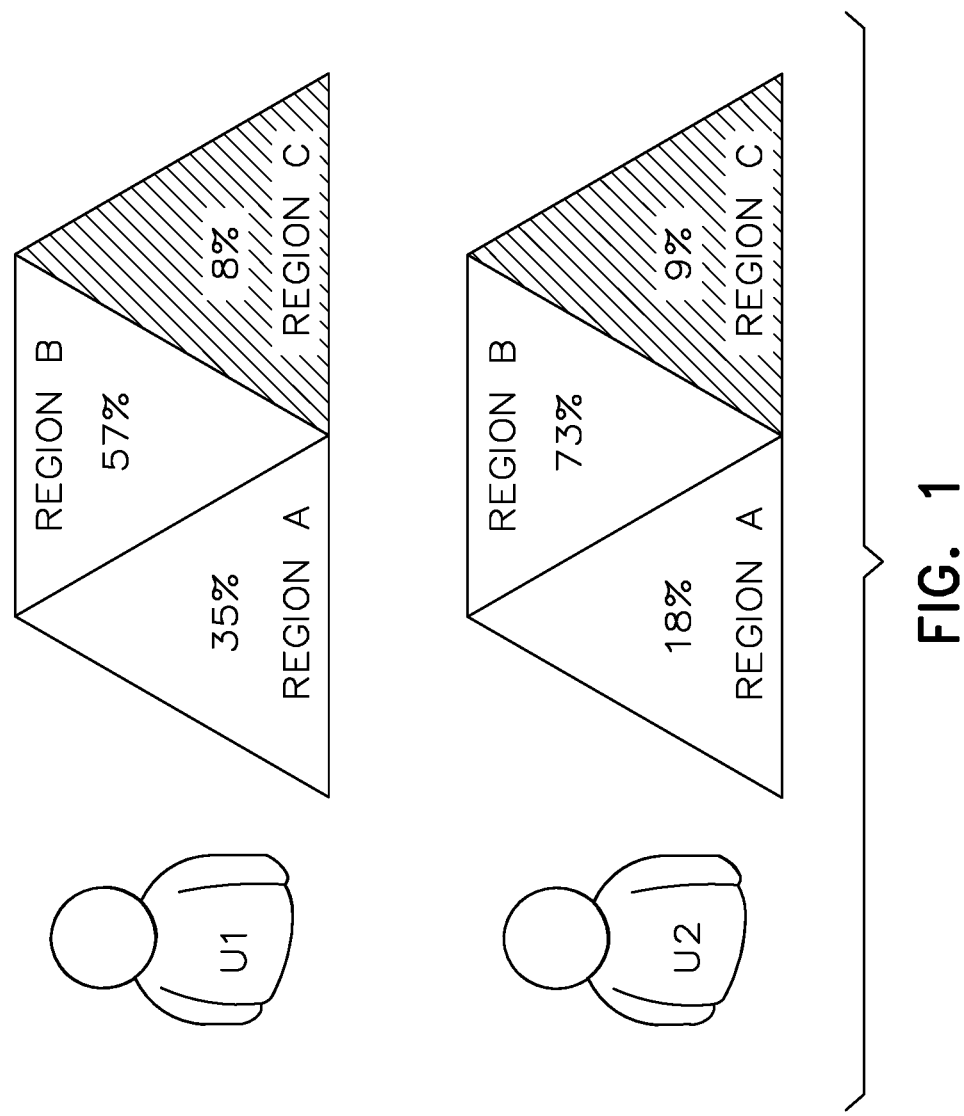
FIG. 1 is a simplified pictorial illustration depicting different users and their consumption of content in different geographic regions, according to an embodiment of the present disclosure.

Reference is now made to FIG. 1, which is a simplified pictorial illustration depicting different users and their consumption of content in different geographic regions, according to an embodiment of the present disclosure. A first user, designated U1 in FIG. 1, is shown aside a "map" of three triangles, where each of the triangles represents a geographic region. Although each triangle representing a geographic region is depicted as a triangle, and is given particular borders and neighboring regions in the figure, it is understood that the figure is symbolic, and an actual geographic region typically has its own shape, borders, and neighbors. A second user, designated U2 in FIG. 1, is shown aside a similar "map" of three triangles. Each of the triangles depicted for user U2 corresponds to the same geographic regions as do the triangles depicted for user U1.

For ease of description, each of the triangles representing one of the geographic regions in the "map" will be referred to below using the term "region". Thus, by way of example, each triangle labelled as "Region C" may be referred to below as Region C, as is the case in a map—for example, the depiction of "Utah" on the map is often referred to as Utah, and so forth.

Each region of the map is shown with a percentage, indicative of the consumption of a video event by the user in a given region. For example, over time, user U2 may consume the same show, or one show of a linked or associated series of shows, or different instances of the same show (e.g., different chapters or episodes of the same soap opera every day; the daily news; etc.) 18% of the time in region A, while consuming the same show 73% of the time in region B.

For ease of discussion, the following table summarizes the example of FIG. 1:

TABLE 1

|  |  | REGION | | |
| --- | --- | --- | --- | --- |
|  |  | A | B | C |
| USER | 1 | 35 | 57 | 8 |
|  | 2 | 18 | 73 | 9 | values in percent

In both cases, region C is depicted as having a dotted background, in order to indicate that region C is considered to be a "home region" for each of the users. For instance, both Users U1 and U2 may register with a service provider one of: their household address; or their billing address, as being in Region C.

For traditional forms of network content distribution, an origin of the content is either fixed, originating in one particular location, or has geographically disperse origins, each of which has a mirrored replication of the content to be distributed. In a traditional network content distribution system, both Users U1 and U2 might both receive content from a centrally located broadcast provider, say located in Region B. For some cloud digital video recorders (CDVR) deployments, legal and contractual constraints may preclude mirroring, caching, and sharing of the content. These constraints result in a very high cost of distribution infrastructure as most of the traditional approaches for economically scaling the network content distribution are accordingly constrained. For instance, the broadcast provider would have to maintain a copy of the same recorded content item for both of Users U1 and U2. Multiplied across millions of users, the space and network requirements vastly increase for broadcast providers or content distribution networks (CDNs).

Thus, any optimization of network resources and response times during CDVR content distribution, is based on selecting the optimal origin at the time of content ingest or content recording, rather than at the time of content retrieval by the client as is typically done in CDNs.

In some embodiments, therefore, a data center(s) on which a specific cloud digital video recording will be recorded, will be selected based on information which includes geographical locations of client device(s) that may be used to play the content, viewing patterns of CDVR content in the viewer household, and the cost of ingesting the content in various origins. For example, in typical CDVR systems, since both Users U1 and U2 are identified with the home region of Region C, then content for both Users U1 and U2 would typically be recorded and then stored in a data center(s) located in and associated with users located in Region C.

Figure 2:
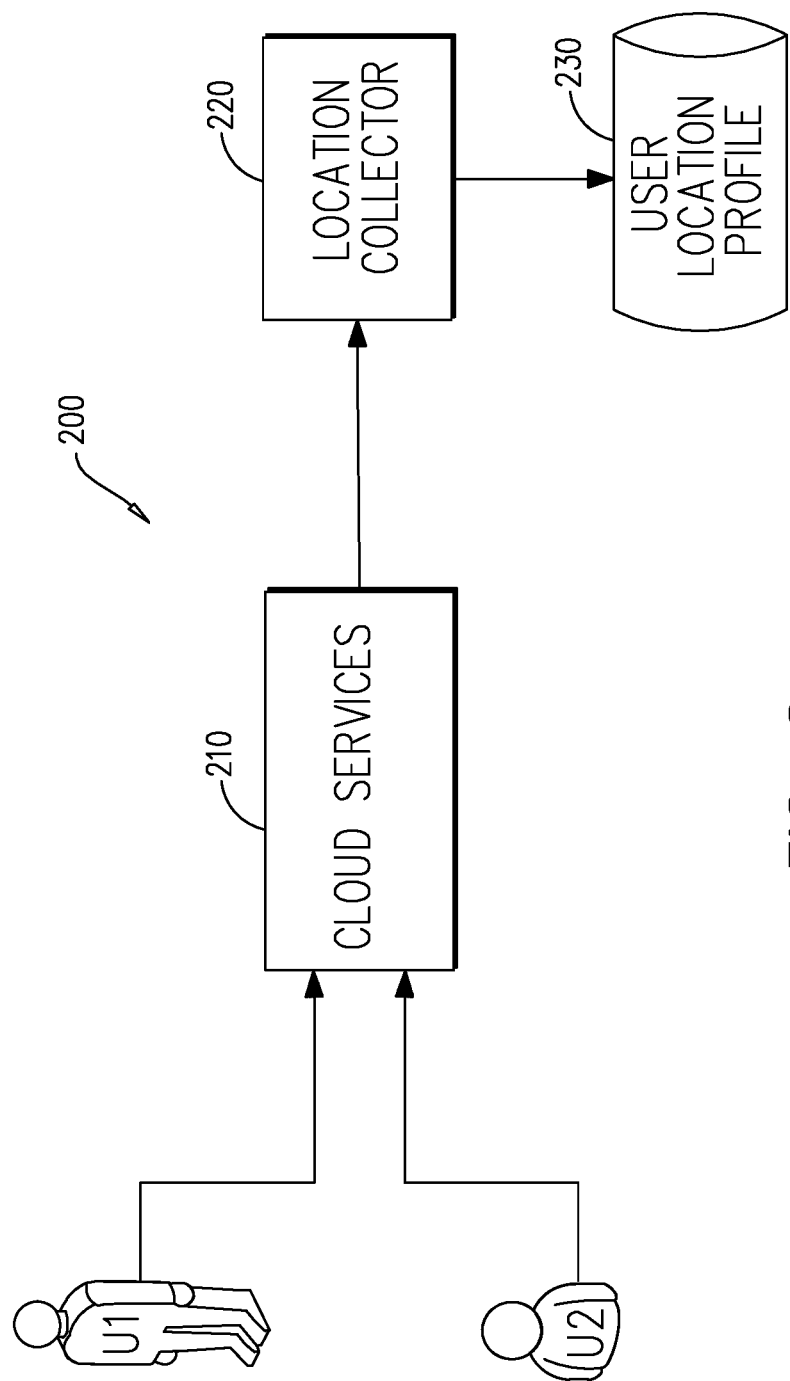
FIG. 2 is a simplified block diagram depicting a system for monitoring location of client devices, according to an embodiment of the present disclosure.

Reference is now made to FIG. 2, which is a simplified block diagram depicting a system 200 for monitoring location of client devices, according to an embodiment of the present disclosure. Locations of client devices used with embodiments of the method and system described herein will be monitored over a period of time. The period of time may be selected per client device type or dynamically calculated based on client device behavior. Such monitoring gives statistics of the sort shown both in Table 1 and FIG. 1 for each client device which might be in use in the system 200. By way of example, User U1 might be a sales representative travelling over the three Regions A, B, and C. User U1 might spend most days visiting clients in Regions A and B, and as such, might view "The Pennsyltuckian", a popular day time television drama, daily, while eating lunch. On the other hand, User U2 might be a college student who lives in a college dormitory in region B, works part time in region A, and is billed at his or her parent's address, in region C. User U2's viewing pattern for "The Pennsyltuckian" loosely reflects the balance in the amount of time User U2 spends in each of these regions.

A CDVR system may typically comprise at least one CDVR recorder; one or more servers which receive and process user requests; a network which connects a user to the at least one CDVR recorder and the one or more servers in order to distribute content; and other elements, as are known in the art. The network which provides and distributes "The Pennsyltuckian" might monitor where users, such as Users U1 and U2, consume the content. For example, User U1 might watch "The Pennsyltuckian" on a tablet, and appropriate statistics would be gathered by the network, said statistics reflecting geographic viewing habits of User U1. Similar statistics might be gathered for user U2.

A location of each user's client device may be monitored using various methods, including (but not limited to) monitoring each time the client device performs a request to the service provider cloud services 210 (i.e., CDVR video streaming requests or other requests). A location collector 220 can then be used to derive the client device's location, either because the client device is at a known site, i.e. the user's home or office, or, the client device location can be inferred from the IP address of the requesting client device, by using a localization service (such as MaxMind, or other similar services known in the art), or by the client device reporting its location as acquired through GPS (Global Positioning System). It is appreciated that many existing systems collect client device location, for example, in order to enforce viewing business rules. The client device location for each user can then be stored in a database of user location profiles 230. Table 1 above provides exemplary user location profiles for users U1 and U2. It is appreciated that the user location profiles stored in user location profiles database 230 might also include information broken down: per user; per location; per viewing time and per content property, such as, but not limited to channel, genre, series, etc. or a combination thereof. By way of example, user U1, as is noted above, watches "The Pennsyltuckian" 57% of the time in region B. However, user U1 may watch the 8:00 AM morning show only 6% of the time in region B.

CDVR content viewing patterns may be calculated depending on either or both of content types and client device types, including, but not limited to, statistics of the common playback time(s) and playback client device(s) for various types of content. Resulting data may be collected using a moving time window, so new consumption patterns are learned by the system 200.

The main parameters of the calculation are:
(a) Playback requests from the CDVR;
(b) Client device location at time of playback request and during playback; and
(c) Content secondary data, including metadata, such as, but not limited to, channel, genre, parental rating, and series information.

Based on the above parameters, a probability percentage of playback location may be calculated. For shows which are parts of series with a large data set, the calculation may be based on series information. It is appreciated that a regularly repeated event, such as a 6:00 PM daily news program, may be considered a series, even though the event itself (e.g., the 6:00 PM daily news program) may not be identified as a series in the broadcasting system. If a series CDVR playback pattern is not established, or a show does not belong to a series, then other data, such as channel, genre and parental rating information may be used to calculate the probability percentage of playback location. For each location, the system 200 tabulates the number of times that content of a given genre is viewed by the user, such as user U1 and U2. Similarly, the system 200 tabulates channel, parental rating type, and so forth for each content item viewed by the user. Based on the results of the tabulations, the system 200 may then predict, given a new recording, the probability that the new recording will be viewed in a given location. One approach would be to consider prediction of the probability a problem of statistical classification, and accordingly, methods known in the art, such as linear classifiers or Naïve Bayes may be applied in order to assist in making the prediction. By way of example, for a linear classifier, defining $p(\text{type\_of\_content\_x}, \text{region\_y})$ as the probability that content of type x (genre, channel, etc.) will be consumed in region_y (calculated as the result of the tabulation of the times that content of type x was consumed in region y, divided by the total number of times the user consumed the content item in question), then a predictor function will take the form of:

score(content,region_y)=sum(p(type_of_content_n, region_y)*w(n,y))

where the sum is performed over all type of contents (n) to which the content item in question belongs, and w(n,y) is a regression parameter which is calculated by minimizing the error between the results predicted by the model and the actual observed consumption patterns. Those of skill in the art will appreciate that other methods for predicting content playback location are also possible.

If a household CDVR playback pattern is not established, for whatever reason, then the system 200 may use locations of all video services consumption by client devices associated with the household in order to calculate the probability percentage of playback location. Finally, if there is no data which is useful for determining the probability percentage of playback location for a given household or its associated client devices, then, the location of the content recording will be determined by data center loads and resource availability. That is to say, the content will be recorded in a household associated home region data center, if the home region data center has sufficient resources to do so. If the home region data center does not have the required resources, then the content will be recorded in the nearest data center which has the required resources.

In some embodiments, and without limiting the generality of the above discussion, the probability percentage of playback location may be calculated as follows:

$$\text{Probability} = \frac{\text{User Playback Requests from Region } N}{\text{Total User Playback Requests}}$$

It is appreciated that the use of the term "cost" (in all of its various grammatical forms) is to be understood in the present disclosure and claims to be referring to a number (often a unitless number) assigned to a measure of the relative desirability of a one option as opposed to another from the standpoint of computing and networking efficiency in the system described herein. The term "value" will be used as a synonym of "cost" herein in both the present disclosure and claims. Accordingly, discussion below of such terms as "BGP_Recording_Cost"; "BGP_Distribution_Cost"; "RecordingCostFactor"; and "Region-PlaybackCost" are to be understood vis-à-vis networking and computing resources.

In view of the above, description, and using the data provided in Table 1, the following may be used to determine in which region to record content for a given user:

Let BGP_Recording_Cost=BGP_Hops from source_Region to recording Region; and

Let BGP_Distribution_Cost=BGP_Hops from recording_Region to playbackRegion

Where:

BGP is the Border Gateway Protocol, a well-known, a standardized exterior gateway protocol designed to exchange routing and reachability information among autonomous systems (AS) on the Internet. (BGP is specified in RFC 4271, as is known in the art.)

BGP Hops is the number of network nodes traversed between the source of the content (i.e. "source_Region") and its destination (i.e. "recording_Region"). By way of example, if the source_Region is region A, then, referring to the triangles of FIG. 1, if the content is to be recorded in region B, then BGP_Hops=1, and, if the content is to be recorded in region C, then BGP_Hops=2. A similar calculation is applied, mutatis mutandis, in determining BGP_Distribution_Cost.

Then, a Recording Cost Factor is determined, comparing the BGP_Recording_Cost and the BGP_Distribution_Cost for each recording a subscriber wants to make. Typically, the recording cost is inexpensive and the distribution cost is expensive. However, the determination of recording cost is an empirical determination, dependent on cost per recording center. By way of example, the cost of recording one thousand unique copies of a given content item in one location is typically less expensive than the cost of performing one hundred recordings in ten different locations. Typically, the recording cost is dependent on a number of factors including:

Recording time, which takes into account the need to pull a number of multicast or unicast adaptive bitrate recording (ABR) feeds into each recording location and the efficiency of performing large disk write operations versus small disk write operations (i.e. operations in which a large amount of data is written in a single write operation is typically more efficient than operations in which a small amount of data is written in a single write operation); and Storage time, which takes into account the number of copies to be made in each location.

It is appreciated that storage cost and disk write operations may be considered separate factors because there is a maximal input/output bandwidth for the disk, beyond which the data cannot be written to the disk, even if there is space available. Storage cost, by contrast, refers to the actual space in the disk which is used to store the recorded content.

An exact calculation of recording cost will vary based on the recording system, since the weighting of the disk input/output will vary. However, one typical implementation of such a calculation would be:

$$\text{Recording Cost Factor} = \frac{\text{Effective Recording Unit}^2 - \text{Recording Unit}}{\text{Effective Recoring Unit}^2}$$

Where "Effective Recording Unit" is a number of simultaneous recordings in progress occurring when the system is operating at its targeted efficiency, and "Recording Unit" is the number of the additional recording of the program (i.e. the current number of recordings of the same program in the data center+1). That is to say, Recording Unit is a cost factor, based on a number of recordings of the same program instance in a given data center. For example, where effective recording unit is, by way of example, 500, as the number of recordings for a program in the datacenter go up, then the recording cost factor goes down, as indicated in Table 2:

TABLE 2

| Datacenter Recording Count | Recording Cost Factor |
| --- | --- |
| 0 | 1.000000 |
| 1 | 0.999996 |
| 5 | 0.999900 |
| 10 | 0.999600 |
| 25 | 0.997500 |
| 50 | 0.990000 |
| 100 | 0.960000 |
| 250 | 0.750000 |
| 300 | 0.640000 |
| 350 | 0.510000 |

TABLE 2-continued

| Datacenter Recording Count | Recording Cost Factor |
|---|---|
| 400 | 0.360000 |
| 450 | 0.190000 |
| 500 | 0.000000 |
| 500+ | 0.000000 |

Generalizing the above discussion, as the number of recordings for a given content (i.e. program) in the datacenter go up, then the recording cost factor goes down. After a certain point, the cost of adding additional recordings will, effectively, be negligible.

In this way, resource balancing is achieved between the data centers. When the capacity of one of the data centers decreases, only recordings with a high probability to be consumed in that data center's region are recorded in the data center, and recordings with a lower Playback_Probability are offloaded to the data center with the next greatest probability that the recording will be consumed in that data center's region.

Accordingly, the total cost of recording in region X and playing the content from there is (given N regions):

$$Region\_X\_Cost=BGP\_Recording\_Cost\_X*Recording\_Cost\_Factor\_X+sum(Region\_1\_Playback\_Cost, \ldots, Region\_N\_Playback\_Cost)$$

Where Region_Playback_Cost=BGP_Distribution_Cost*Playback_Probability.

In order to take into account the available capacity of each data center (which is a function of the available storage, available computational resources, available data throughput bandwidth, etc.), a penalty inversely proportional to the available capacity may be added to the calculated cost of recording in each data center, so that the total cost for recording in a given region would be Region_X_Cost+penalty, where the penalty is of the form:

$$k1/(C+k2)$$

where C is equal to an available capacity of the data center (between 0 and 1, for example, if the data center is currently half full, capacity C=0.5) and k1, k2 are empirically determined constants. Note that as C approaches zero, the penalty becomes large. If C is about the same for all data centers, the penalty does not affect the calculation.

Figure 3:
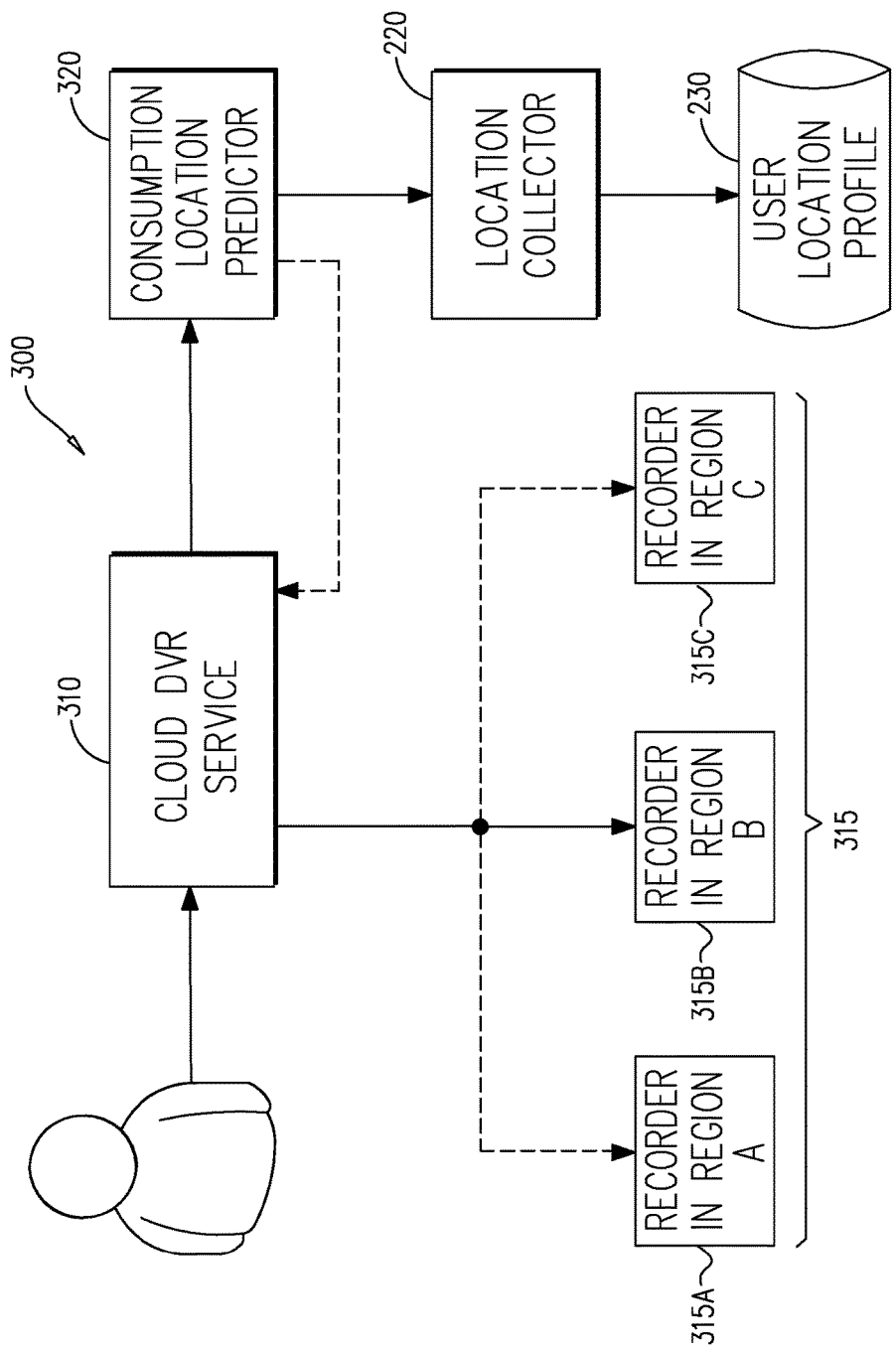
FIG. 3 is a simplified block diagram depicting a system for selecting a data center in which to store video recordings to be made available to remote client devices, according to an embodiment of the present disclosure.

Reference is now made to FIG. 3, which is a simplified block diagram depicting a system 300 for selecting a data center in which to store video recordings to be made available to remote client devices, according to an embodiment of the present disclosure. Based on the method discussed above, a Cloud DVR Service 310 will predict the most probable location from among a plurality of data center regions 315 where a content ordered to be recorded by a given user will be consumed, and select an appropriate regional data center 315A-315C where the content will be recorded and stored (the closest to the predicted user consumption location).

The content may also be recorded in more than one of the multiple regional data centers (e.g. 315A, 315B, 315C), if a prediction is made that the consumption of the content will be done from multiple centers, and it may be duplicated or transferred to other Cloud DVR regional data centers, depending on legal or contractual constraints, as explained above. For example, if the result of the above method indicates that two (or more) regions are of equal probability, the content may be stored in both data centers in both regions (e.g. two of 315A, 315B, 315C). In principle, if the cost of recording in two data centers and then distributing from the nearest of the two data centers is lower than the estimated cost of distributing from the lower cost data center, as per the above calculations, then the system 300 may, in fact, record the content in both data centers. By way of example, assume two data centers, referred to as A and B. Data center A is located in region A, and data center B is located in region B. The estimated cost of recording in A is:

$$Ra+Da*Pa+Dab*Pb$$

The estimated cost of recording in B is:

$$Rb+Db*Pb+Dba*Pa.$$

Where:
Ra=recordings costs in A; Rb=recordings costs in B
Da=distribution costs inside A; Db=distribution costs inside B
Pa(b)=estimated probability that recording will be consumed in A (B); Pb(a)=estimated probability that recording will be consumed in B (A)
Dab=distribution cost from A to B; Dba=distribution cost from B to A.
The cost of recording in both and distributing is:

$$Ra+Rb+\min(Da*Pa,Db*Pb)$$

Accordingly, if by way of example, letting: Da=0.1, Dab=Dba=1, Db=0.2, Ra=0.3, Rb=0.1, then, the cost given different Pa probabilities are as indicated below, in Table 3:

TABLE 3

| Pa | Cost A | Cost B | Cost both |
|---|---|---|---|
| 0.1 | 0.49 | 0.38 | 0.41 |
| 0.2 | 0.48 | 0.46 | 0.42 |
| 0.3 | 0.47 | 0.54 | 0.43 |
| 0.4 | 0.46 | 0.62 | 0.44 |
| 0.5 | 0.45 | 0.7 | 0.45 |
| 0.6 | 0.44 | 0.78 | 0.46 |
| 0.7 | 0.43 | 0.86 | 0.46 |
| 0.8 | 0.42 | 0.94 | 0.44 |
| 0.9 | 0.41 | 1.02 | 0.42 |

As the above table demonstrates, there are cases where it is less costly to record in both regions.

The above methods are typically implemented in a computer, such as consumption location predictor 320, or a distributed computing environments. At least one device implementing the above method comprises at least one processor. Processors may be implemented in hardware, software, firmware, or a combination of both. One or more processors may be a special purpose processor operative to perform the method described herein. The processor is typically associated with non-transitory computer-readable storage media (i.e. memory). The memory may store instructions, which at least one of the processors may execute, in order to perform the method described herein. Additionally, there is typically at least one storage device and/or memory associated with the system described herein above as well. The processor is typically able to instruct that the recording of the broadcast video be made on a storage device situated in a determined preferred storage region, as per the calculations described hereinabove.

Figure 4:
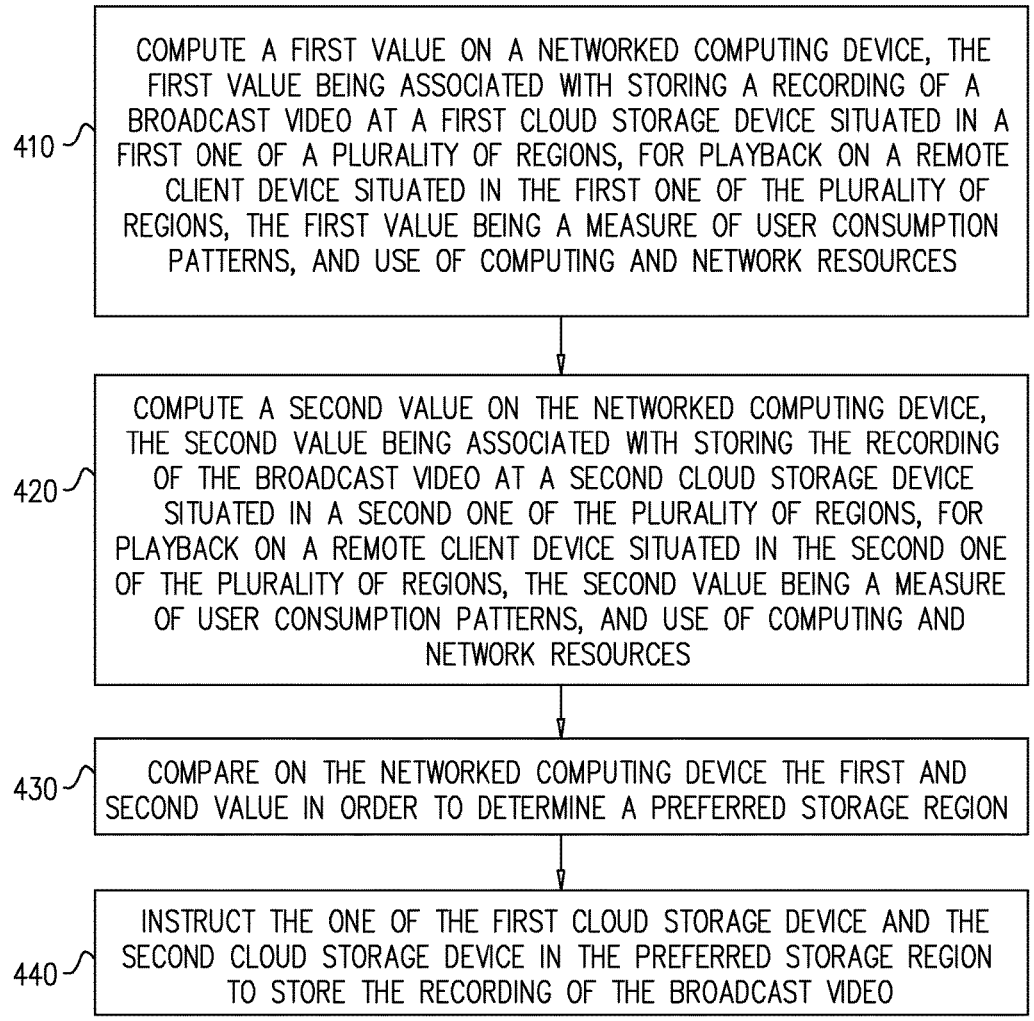
FIG. 4 is a flow chart of one method for optimizing cloud DVR content location according to an embodiment of the present disclosure.

Reference is now made to FIG. 4, which is a flow chart of one method for optimizing cloud DVR content location according to an embodiment of the present disclosure. In step 410, a first value is computed on a networked computing device, such as the consumption location predictor 320, the first value being associated with storing a recording of a broadcast video at a first cloud storage device situated in a first one of a plurality of regions, for playback on a remote client device situated in the first one of the plurality of regions, the first value being a measure of user consumption patterns and use of computing and network resources.

For example and without limiting the generality of the foregoing, the measure of user consumption patterns may take into account the probability percentage of playback location, as described above. Similarly, and without limiting the generality of the foregoing, the use of computing and network resources may take into account the recording cost factor, as described above.

Similarly, at step 420, a second value is computed on a networked computing device, the second value being associated with storing the recording of the broadcast video at a second cloud storage device situated in a second one of the plurality of regions, for playback on a remote client device situated in the second one of the plurality of regions, the second value being a measure of user consumption patterns and use of computing and network resources.

The first and second values are compared on the networked computing device in order to determine a preferred storage region (step 430). The one of the first cloud storage device and the second cloud storage device in the preferred storage region is, at step 440, instructed to store the recording of the broadcast video.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
   computing a first value on a networked computing device, the first value being associated with storing a recording of a broadcast video at a first cloud storage device situated in a first one of a plurality of regions, for playback on a remote client device situated in the first one of the plurality of regions, the first value being a measure of:
   user consumption patterns; and
   use of computing and network resources;
   computing a second value on the networked computing device, the second value being associated with storing the recording of the broadcast video at a second cloud storage device situated in a second one of the plurality of regions, for playback on a remote client device situated in the second one of the plurality of regions, the second value being a measure of:
   user consumption patterns; and
   use of computing and network resources;
   comparing on the networked computing device the first and second value in order to determine a preferred storage region; and
   instructing the one of the first cloud storage device and the second cloud storage device in the preferred storage region to store the recording of the broadcast video.

2. The method according to claim 1, wherein either or both of the first and second cloud storage devices comprise a cloud digital video recorder (cDVR).

3. The method according to claim 1, wherein secondary data is used in the computations of the first value and the second value when data concerning user consumption patterns and use of computing and network resources are insufficient to produce a useful result of the computation.

4. The method according to claim 3, wherein the secondary data comprises at least one of: channel data; genre data; series information; a time the broadcast video was broadcast; time of previous consumption; or parental rating information.

5. The method according to claim 1, and further comprising instructing storage of the recording of the broadcast video in a home region with which the remote client device is associated if the step of comparing the first and second value in order to determine a preferred storage region is inconclusive.

6. The method according to claim 1, and further comprising instructing storage of the recording of the broadcast video in a neighboring region if the preferred storage region has insufficient resources to store the recording of the broadcast video.

7. The method according to claim 6, wherein the neighboring region is a region having a data center nearest to the home region with which the remote client device is associated.

8. The method according to claim 1, wherein the first value and the second value are functions of, respectively, a first recording cost factor and a second recording cost factor.

9. The method according to claim 1, wherein the first value and the second value are functions of, respectively, a first playback cost factor and a second playback cost factor.

10. The method according to claim 1, wherein the storing the recording is instructed in the one of the first one and the second one of the plurality of regions having more available resources if the first value and the second value are the same.

11. The method according to claim 1, wherein, if the step of comparing the first and second value in order to determine a preferred storage region fails to yield a preferred storage region, then the instructing comprises instructing both the first cloud storage device and the second cloud storage device to store the recording of the broadcast video.

12. The method according to claim 1 and wherein, after the recording of the broadcast video is stored, the recording it made available to the remote client device upon request.

13. A networked computing device operative to:
   compute a first value, the first value being associated with storing a recording of a broadcast video at a first cloud storage device situated in a first one of a plurality of regions, for playback on a remote client device situated in the first one of the plurality of regions, the first value being a measure of:
   user consumption patterns; and
   use of computing and network resources;
   compute a second value, the second value being associated with storing the recording of the broadcast video at a second cloud storage device situated in a second one of the plurality of regions, for playback on a remote client device situated in the second one of the plurality of regions, the second value being a measure of:
  user consumption patterns; and
  use of computing and network resources;
compare, at a processor, the first value and the second value; and
instruct the one of the first cloud storage device and the second cloud storage device of the preferred storage region to store the recording of the broadcast video.

14. The networked computing device according to claim 13, wherein either or both of the first and second cloud storage devices comprise a cloud digital video recorder (cDVR).

15. The networked computing device according to claim 13, wherein the secondary data is used in the computations of the first value and the second value when data concerning user consumption patterns and use of computing and network resources are insufficient to produce a useful result of the computation.

16. The networked computing device according to claim 13, wherein the secondary data comprises at least one of: channel data; genre data; series information; a time the video was broadcast; time of previous consumption; or parental rating information.

17. The networked computing device according to claim 13, and further operative to instruct a cloud storage device in a home region with which the remote client device is associated to store the recording of the broadcast video if the comparing the first and second value by the processor in order to determine a preferred storage region is inconclusive.

18. The networked computing device according to claim 13, and further operative to instruct a cloud storage device in a neighboring region to store the recording of the broadcast video if the preferred storage region has insufficient resources to store the recording of the broadcast video.

19. The networked computing device according to claim 18 wherein the neighboring region is a region having a data center nearest to the home region with which the remote client device is associated.

20. A non-transitory computer program product that stores a set of instructions which when executed perform a method executed by a set of instructions comprising:
  computing a first value on a networked computing device, the first value being associated with storing a recording of a broadcast video at a first cloud storage device situated in a first one of a plurality of regions, for playback on a remote client device situated in the first one of the plurality of regions, the first value being a measure of:
    user consumption patterns; and
    use of computing and network resources;
  computing a second value on the networked computing device, the second value being associated with storing the recording of the broadcast video at a second cloud storage device situated in a second one of the plurality of regions, for playback on a remote client device situated in the second one of the plurality of regions, the second value being a measure of:
    user consumption patterns; and
    use of computing and network resources;
  comparing on the networked computing device the first and second value in order to determine a preferred storage region;
  instructing the one of the first cloud storage device and the second cloud storage device in the preferred storage region to store the recording of the broadcast video.

* * * * *